Patented Mar. 6, 1951

2,544,365

UNITED STATES PATENT OFFICE 2,544,365

ACYLATED PHENOL-FORMALDEHYDE RESINS CONTAINING KETENE POLYMERS OF HIGHER FATTY ACIDS

Ben E. Sorenson, Drexel Hill, Pa., assignor to E. I. du Pont de Nemours & Company, Wilmington, Del., a corporation of Delaware No Drawing. Application April 10, 1946, Serial No. 661,057

2 Claims. (Cl. 260—19)

This invention relates to a new chemical process and products and more particularly to a new chemical process and products which may be the basis of decorative and protective coatings and the like.

Non-drying, semi-drying and drying oils are major constituents, particularly in varnishes and enamels.

When simple mechanical mixtures of oils and resins are employed as decorative or protective coatings, the appearance of the coating after prolonged exposure to the elements is prone to become unsightly probably because the individual constituents of the mixture weather at different rates of speed. Such heterogeneity is therefore undesirable in a coating material which is to withstand outside exposure.

This invention, therefore, presents as its principal object the provision of means for producing new and useful products from the acids of the semi-drying and drying oils, and phenol-formaldehyde resins by causing the fatty oil acid to combine chemically with the resin, thus forming a homogeneous chemical compound.

Another object is the provision of means for producing new and useful products which dry satisfactorily to films possessing excellent properties.

A still further object is to provide means for producing new and useful products which are applicable as film-forming agents.

Still another object is the provision of means for producing new and useful products from long chain monocarboxylic acids and phenol-formaldehyde resins which may be polymerized, and which retain substantially the same degree of saturation or unsaturation as the long chain monocarboxylic acid entering the reaction.

Still another object is the production of new and useful products which may vary in properties possessed, from those of a drying oil to those of a solid.

A still further object is the provision of a new, simple, and practical method for producing acylated phenol-formaldehyde resins, combined with ketene polymers of the higher fatty acids.

Other objects will become readily apparent as the description of the invention proceeds.

These and other objects are accomplished in the present invention by causing the ketenes of the higher fatty acids to copolymerize with acylated phenol-formaldehyde resins, as well as with themselves to form a new and useful film-forming copolymer.

The reactions of this process are believed to be represented by the following equations:

*Reaction I.—Formation of ketenes of the higher fatty acids*

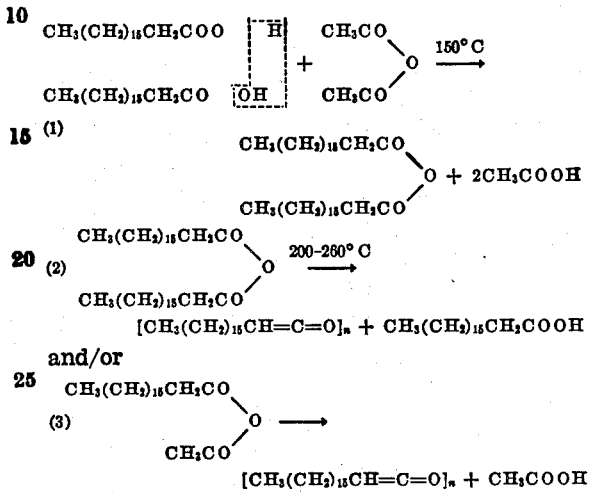

*Reaction II.—Formation of acylated phenol-formaldehyde resins*

Reaction A

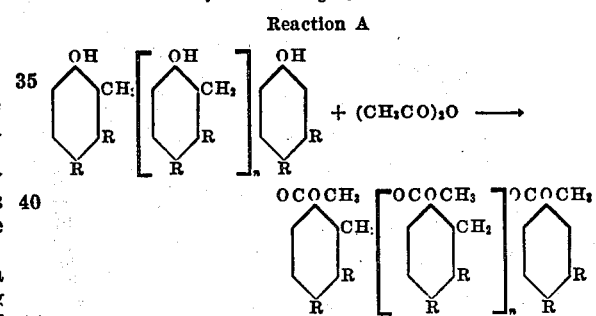

R may be an alkyl or hydrogen group and may be in the ortho, meta, or para position in relation to the hydroxyl.

$n$ is an integer, and may be one or more, and may be changed by the ratio of phenol to formaldehyde used, and by the type and concentration of the catalyst.

Acid-condensed phenol-formaldehyde resins are the most desirable, but basic-condensed type may be used.

Reaction B

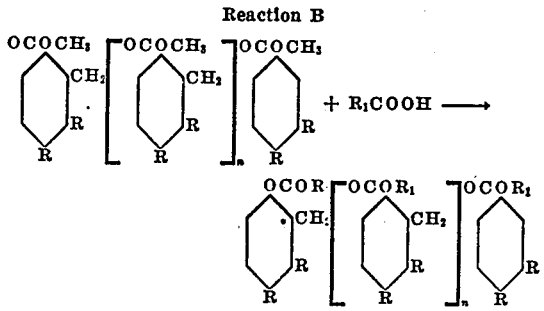

R = alkyl radical containing not more than 6 carbon atoms or hydrogen
$n$ = one or more
$R_1$ = radical of the long chain monocarboxylic acid Phenols suitable for preparing these resins may be alkyl substituted in the ortho, meta or para positions with respect to the hydroxyl, provided that two active ring positions are available for reaction with formaldehyde. Phenols having one aryl substituent may also be used.

I have found that under certain conditions described below the ketenes of the higher fatty acids (the product of Reaction I) may be caused to react with the phenol-formaldehyde resins or the acylated phenol-formaldehyde resins (the product of Reaction II) as well as with themselves, to form a new and useful homogeneous film-forming copolymer.

This reaction may be represented as taking place in four steps. The first step involves the acetylation of the phenol-formaldehyde resin (Reaction IIa); the second step involves the acid interchange of the acetylated phenol-formaldehyde resin with radicals of the higher fatty acids (Reaction IIb); the third step, which takes place at a higher temperature, involves the production of ketenes of free fatty acids by the action of acetic anhydride (Reaction I); and the fourth step involves the copolymerization of the products of the second step with those of the third.

I have found that these reactions may be made to take place in the same reaction vessel.

The invention will be more fully understood from the following examples and detailed description which are given by way of illustration and not limitation except insofar as defined by the appended claims. The parts are by weight unless otherwise specified. The viscosity and color designations are on the Gardner-Holdt scale which is used in varnish and resin practice.

*Example 1*

| | Parts |
|---|---|
| Phenol-formaldehyde resin [1] | 133 |
| Linseed oil acids (distilled) | 248 |
| Acetic anhydride (technical) | 100 |
| Acetic anhydride (technical) | 111 |

[1] Phenol-formaldehyde resin made by acid condensing 4 mols of phenol and 3 mols of formaldehyde (formalin) and drying by heating to 220° C. and blowing with an inert gas. (Viscosity of resin is I–L on the Gardner-Holdt scale when thinned to 45% solids in ethylene glycol monoethyl ether. Resin insoluble in linseed oil.)

The phenol-formaldehyde resin, linseed oil acids and 100 parts of acetic anhydride are placed in a one liter three necked flask fitted with a mechanical stirrer, a thermometer extending into the liquid, a dropping funnel discharging above the liquid, a sampling tube also used as a blowing tube and a bead packed column with a fractionating head at the top.

The contents of the flask are heated until the resin is melted. The agitator is started and the heating is continued until refluxing starts. Acetic acid (B. P. 117–119° C.) is drawn off and the liquid temperature is allowed to rise to 240–250° C. It is held here and the second lot of acetic anhydride is added slowly through the dropping funnel at the same rate as the acid is distilled out. When all of the acetic anhydride is added the column is removed and replaced with a short distilling head connected to a condenser and a receiver.

The batch is stirred and heated while inert gas (nitrogen or carbon dioxide) is blown through. This heating and blowing is continued until a sample removed from the batch has an acid number of 5 or less.

The reaction is discontinued and cooled below 200° C. before thinning with mineral spirits.

Constants:

| | |
|---|---|
| Non-volatile per cent | 85 |
| Viscosity | V |
| Acid number | 3.7 |
| Color | 6.2 |

Films from the resin thinned with more mineral spirits dry dust free in 4 hours and tack-free to a slight residual tack in 24 hours without metallic driers. Cobalt drier added to the solution gives films that air dry more rapidly.

*Example 2*

| | Parts |
|---|---|
| Phenol-formaldehyde resin [1] | 318 |
| Linseed oil acids (distilled) | 840 |
| Acetic anhydride (technical) | 300 |
| Acetic anhydride (technical) | 235 |

[1] The phenol-formaldehyde resin was made by condensing 4 mols of phenol with 3.5 mols of formaldehyde and dried by heating at 220° C. with an inert gas blow. (Viscosity of resin G–Q when thinned to 40% solids in ethylene glycol monoethyl ether.) (Resin insoluble in oil.)

The resin, linseed oil acids and 300 parts of acetic anhydride are placed in a three liter three necked flask fitted as is described in Example 1. The reaction is run in the same way as in Example 1, except that the second acetic anhydride is added until a sample of melt removed from the batch and thinned (60% melt and 40% mineral spirits) has a viscosity of C. This usually requires the amount of acetic anhydride in the above charge but it may vary depending on the column and on the rate of addition of acetic anhydride.

The column is removed as in Example 1 and the batch is blown with inert gas until a sample removed from the flask has an acid number of 10–15.

The melt is cooled and thinned with mineral spirits.

Constants:

| | |
|---|---|
| Non-volatile per cent | 50 |
| Viscosity | H |
| Color | 4.3 |
| Acid number | 11.0 |

Films from the resin thinned with mineral spirits to flowing viscosity dried dust free in 2 hours and to a slight residual tack in 8 hours without metallic driers.

Example 3

| | Parts |
|---|---|
| Phenol-formaldehyde resin[1] | 400 |
| Linseed oil acids (distilled) | 740 |
| Acetic anhydride (technical) | 300 |
| Acetic anhydride (technical) | 189 |

[1] Same type of phenol-formaldehyde resin as was used in Example 2.

The first three portions of the above charge are placed in a three liter three necked flask equipped as is described in Example 1. The resin is made by the same procedure as is described in Example 1. After all of the second lot of acetic anhydride is added, the column is replaced by a short distilling head and condenser and the resin is blown with inert gas until a sample removed from the batch has a viscosity of H (60 parts resin, 40 parts mineral spirits), and an acid number under 10.

The resin is cooled and thinned with mineral spirits.

Constants:
- Non-volatile _____ per cent__ 60
- Viscosity _____ H
- Acid number _____ 2.3
- Color _____ 3.8

Films from the resin thinned to flowing viscosity air dried dust free in 2 hours and tack free in 8 hours without the addition of metallic driers.

Example 4

| | Parts |
|---|---|
| Phenol-formaldehyde resin[1] | 618 |
| Linseed oil acids (distilled) | 2100 |
| Acetic anhydride (technical) | 677 |
| Litharge | 2.5 |
| Acetic anhydride | 330 |

[1] Same type of phenol-formaldehyde resin used in Example 2.

The first four portions of the above charge are placed in a five liter, three necked flask equipped as described in Example 1. The resin is made by the same procedure as Example 1. The heating and blowing with inert gas is discontinued when a sample withdrawn from the batch has an acid number of under 10 and a viscosity of V (85% resin, 15% mineral spirits).

It is cooled and thinned with mineral spirits.

Constants:
- Non-volatile _____ per cent__ 85
- Viscosity _____ W
- Acid number _____ 8.2
- Color _____ 4.4

Films from the resin thinned to flowing viscosity air dry dust free in 2½ hours and tack free to a slight residual tack in 8 hours without metallic driers.

Example 5

| | Parts |
|---|---|
| Phenol-formaldehyde resin[1] | 133 |
| Soy bean oil acids distilled | 246 |
| Acetic anhydride (technical) | 133 |
| Acetic anhydride (technical) | 60 |

[1] Phenol-formaldehyde resin is made by acid condensing 7 mols of phenol and 6 mols of formaldehyde and dried by heating to 220° C. and blowing with an inert gas. The viscosity of the resin is F-G when thinned to 40% solids in ethylene glycol monoethyl ether.

The resin is made by the same procedure and in the same type of apparatus as is described in Example 1. The heating and blowing with inert gas is continued until a sample withdrawn from the batch has an acid number under 10 and a viscosity of J when thinned in mineral spirits (60% resin, 40% solvent).

The melt is cooled and thinned with mineral spirits.

Constants:
- Non-volatile _____ per cent__ 60
- Viscosity _____ J
- Acid number _____ 8.3
- Color _____ 3.8
- Specific gravity _____ .918

Films from the resin air-dry dust-free in three hours and to a slight residual tack in eight to nine hours without metallic driers.

Example 6

| | Parts |
|---|---|
| Phenol-formaldehyde resin[1] | 133 |
| Dehydrated castor oil acids | 246 |
| Acetic anhydride (technical) | 133 |
| Acetic anhydride (technical) | 60 |

[1] Same type of phenol-formaldehyde resin as is described in Example 5.

The resin is run by the same procedure and in the same type of apparatus as is described in Example 1 until all of the second lot of acetic anhydride is added.

After all of the second acetic anhydride has been added and distillation has stopped the column is removed and replaced with a Claisen distilling head, a condenser and a vacuum receiver. The charge is heated to 240° C. and held while the pressure in the flask is gradually reduced to 5 mm. where it is held until about 32-35 parts of acid distillate is removed. The heat is then removed and after the resin is cooled to 200° C. it is thinned with mineral spirits.

Constants:
- Non-volatile _____ per cent__ 60
- Viscosity _____ H
- Color _____ .8
- Acid number _____ 15.0

Films from the resin air dry without metallic driers to a slight top tack in 24 hours but they also frost and crow's-foot. The addition of cobalt drier prevents crow's-footing and also speeds the dry.

Example 7

| | Parts |
|---|---|
| Para tertiary butyl phenol-formaldehyde resin[1] | 160 |
| Linseed oil acids (distilled) | 224 |
| Acetic anhydride (technical) | 108 |
| Acetic anhydride (technical) | 54 |

[1] Para tertiary butyl phenol-formaldehyde resin is made by acid condensing 2 mols of the phenol and 3 mols of formaldehyde. Resin is dried by heating at 220° C. and blowing with an inert gas. The viscosity of the resin is F-G when thinned to 50% solids in ethylene glycol monoethyl ether. It is oil soluble.

The same type of apparatus and the same procedure is used as is described in Example 1. After all of the second lot of acetic anhydride is added and the column is removed and replaced with a condenser and receiver the resin is heated and blown with inert gas until a sample withdrawn from the melt has an acid number 3-5 and a viscosity of I when thinned with mineral spirits (70 parts melt and 30 parts solvent). The resin is cooled and thinned in mineral spirits.

Constants:
- Non-volatile _____ per cent____ 70
- Viscosity _____ K
- Acid number _____ 1.0
- Color _____ 4.1

Films from the resin air dry dust free in 6-7 hours and tack-free in 16-24 hours without metallic driers.

Example 8

| | Parts |
|---|---|
| Diphenylolpropane-formaldehyde resin [1] | 120 |
| Linseed oil acids (distilled) | 224 |
| Acetic anhydride (technical) | 108 |
| Acetic anhydride (technical) | 54 |

[1] Diphenylolpropane-formaldehyde resin is made by condensing 7 mols of the phenol and 6 mols of formaldehyde without a catalyst. The acidity of the formalin is sufficient to cause the reaction to proceed at the boiling point of the reaction mixture. The resin is dried by heating to 220° C. and blowing with an inert gas. The resin has a viscosity of G when thinned to 50% solids with ethylene glycol monoethyl ether. It is oil soluble.

The same type of apparatus and the same procedure is used as is described in Example 1. The resin is heated and blown with inert gas until a sample withdrawn from the melt has an acid number of about 5 and a viscosity of H (60% melt and 40% mineral spirits). The hot melt is cooled and thinned with mineral spirits.

Constants:

| | |
|---|---|
| Non-volatile per cent | 60 |
| Viscosity | P |
| Acid number | 3.6 |
| Color | 4.2 |

Films from the resin air dry dust-free in 3 hours and tack-free in 9 hours without metallic driers.

Example 9

| | Parts |
|---|---|
| Phenol-formaldehyde resin[1] | 840 |
| Linseed oil acids (distilled) | 1280 |
| Acetic anhydride (technical) | 859 |
| Acetic anhydride (technical) | 215 |

[1] Same type of resin as was used and described in Example 5.

The resin is made by the same process and in the same type of equipment as is described in Example 1.

The resin is blown with inert gas until a sample removed from the melt for test has an acid number of 2 to 4 and a viscosity of T (60 parts of resin and 40 parts of mineral spirits).

The resin is cooled and thinned with mineral spirits.

Constants:

| | |
|---|---|
| Non-volatile per cent | 60 |
| Viscosity | W |
| Acid number | 2.0 |
| Color | 3.9 |
| Specific gravity | .925 |

Films from the resin thinned to flowing viscosity air dry dust-free in 3 hours, to a slight residual tack in 6 hours and tack-free in 24 hours.

The acid interchange (second step) may go nearly to completion or a phenol-formaldehyde resin partially acylated with acetic acid and partially with the higher fatty acid may result depending on the way the ingredients are added.

Some acylation may also take place by the direct reaction of the higher fatty acid anhydride (formed by the action of acetic anhydride on the acid) with the phenol-formaldehyde resin.

In the third step which is carried out with an excess of acetic anhydride over and above that required to acetylate the phenol-formaldehyde resin, the higher fatty acids are thought to be dehydrated to give ketenes. These alcoketenes may polymerize with themselves or with the acylated phenol-formaldehyde resin to give homogeneous compositions.

This latter reaction takes place at 220-250° C. so that in the presence of excess acetic anhydride, acid interchange and ketene formation proceed simultaneously. The relative amounts of acid interchange and ketene formation may be regulated by the amount of excess acetic anhydride used and to some extent by withholding the excess acetic anhydride until the desired amount of interchange has taken place.

One mol of acetic anhydride per unit weight of phenol-formaldehyde resin is required for acetylation. (The unit weight of phenol-formaldehyde resin as used here is that weight of resin which contains one phenolic hydroxyl group.) More acetic anhydride than that required for complete acetylation produces ketene polymers of the higher fatty acids. The amount of ketene polymers and acylated phenol-formaldehyde resin can thus be estimated in mols by the amount of excess acetic anhydride used. Excess acetic anhydride used in making these resins may range from .2 to .8 mol per unit weight of resin. The oil acids may vary from .4 mol to 1.25 mols per unit weight of resin.

Small amounts of acetylating catalysts such as the alkali and alkali earth acetates and the tertiary amines may be used to facilitate the acetylation of the phenol-formaldehyde resin. These catalysts also have a tendency to speed up the rate of acid interchange.

Resins made by this process have better color stability than varnishes made by cooking oil soluble phenolic resins into drying oils. Blocking of the phenol hydroxyl groups by acylation with acetic acid and higher fatty acids is apparently responsible for this improvement.

The resins have low acid numbers and viscosities and can be thinned with the cheapest aliphatic thinners. Films from the resins usually air dry without metallic driers but they may be added to speed up the dry where this is desirable. Compositions containing non-conjugated oils and phenolic resins usually air dry quite slowly and require large amounts of active drier.

The process makes it possible to produce fast drying light colored oil modified compositions from straight phenol-formaldehyde resins which are normally incompatible with oils. The non-conjugated drying and semi-drying oil acids may be used whereas in varnish practice it is usually necessary to use at least some conjugated drying oils with phenolic resins to get the best drying varnishes.

It also produces a drying composition from phenol-formaldehyde resins and drying oil acids in which part of the drying oil constituents are chemically combined with the phenolic resins through the phenol-hydroxyl groups.

Because of their low viscosities these polymers are useful to impregnate porous materials.

The polymers herein described may also be used as clear varnishes, or they may be pigmented by known procedures to give paints.

An example of a paint follows:

Example 10

| | Parts |
|---|---|
| Resin solution from Example 9 | 437 |
| Carbon black pigment | 68 |
| Heavy petroleum naphtha | 195 |
| Resin solution from Example 9 | 435 |
| Heavy petroleum naphtha | 225 |
| Lead naphthenate drier (16% lead) | 18 |
| Cobalt naphthenate drier (2% cobalt) | 15 |

The first three ingredients are ground in a ball mill with steel balls for 96 hours or until fine. The mill base is let down with more resin and thinned to viscosity with heavy petroleum naphtha as indicated above. The designated liquid driers are also added.

Viscosity of paint—45 seconds with a #10 cup.

Films of the paint air dry dust-free in two hours and tack-free in eight hours. Similar films without driers air-dry dust-free in 18 hours and tack-free in 48 hours.

It is to be understood that the examples herein are not given as limitations but merely as illustrations. Monocarboxylic acids other than the linseed oil acids, soya bean oil acids or dehydrated castor oil acids of the examples, as well as many different types of phenol-formaldehyde resins may be employed in this reaction.

It is therefore apparent that many different embodiments of this invention may be made without departing from the spirit thereof, and therefore, it is not intended to be limited except as indicated by the appended claims.

I claim:

1. The process of preparing the ketene of a vegetable oil fatty acid in the presence of an acylated phenol formaldehyde resin which comprises (1) reacting a substantial portion of said vegetable oil fatty acid with a soluble acid-condensed phenol formaldehyde resin in the presence of a first substantial portion of acetic anhydride, whereby a phenol formaldehyde resin acylated in substantial proportion with said fatty acid at the phenolic hydroxyl radical position is formed; and (2) thereafter heating the resulting materials to 220°–250° C., adding at said temperature a second substantial portion of acetic anhydride at approximately the same rate as the chemical equivalent amount of acetic acid is distilled out, and continuing the heating until substantially no more acetic acid is formed, whereby the balance of said vegetable oil fatty acid is converted to the corresponding ketene in the presence of said acylated phenol formaldehyde resin, said ketene being present in the product of said process in a proportion sufficient to impart to said product the property of air drying within 24 hours in the absence of metallic drier.

2. The product of claim 1.

BEN E. SORENSON.

REFERENCES CITED

The following references are of record in the file of this patent:

UNITED STATES PATENTS

| Number | Name | Date |
|---|---|---|
| 2,091,965 | Cherry | Sept. 7, 1937 |
| 2,134,388 | Cherry | Oct. 25, 1938 |